(12) United States Patent
Kern et al.

(10) Patent No.: US 7,788,898 B2
(45) Date of Patent: Sep. 7, 2010

(54) VARIABLE COUPLING OF TURBOFAN ENGINE SPOOLS VIA OPEN DIFFERENTIAL GEAR SET OR SIMPLE PLANETARY GEAR SET FOR IMPROVED POWER EXTRACTION AND ENGINE OPERABILITY, WITH TORQUE COUPLING FOR ADDED FLEXIBILITY

(75) Inventors: John Michael Kern, Rexford, NY (US); Michael V. Drexel, Delanson, NY (US); Jeremy Daniel VanDam, W. Coxsackie, NY (US)

(73) Assignee: General Electric Company, Schenectady, NY (US)

( * ) Notice: Subject to any disclaimer, the term of this patent is extended or adjusted under 35 U.S.C. 154(b) by 944 days.

(21) Appl. No.: 11/567,490

(22) Filed: Dec. 6, 2006

(65) Prior Publication Data

US 2008/0138195 A1 Jun. 12, 2008

(51) Int. Cl.
*F02C 7/32* (2006.01)
*F02C 7/36* (2006.01)

(52) U.S. Cl. .................. 60/204; 60/226.1; 60/39.163; 60/802; 74/DIG. 4

(58) Field of Classification Search .............. 60/226.1, 60/39.163, 802, 204; 474/31, 30; 74/DIG. 4
See application file for complete search history.

(56) References Cited

U.S. PATENT DOCUMENTS

| | | | |
|---|---|---|---|
| 3,786,696 A * | 1/1974 | Aleem | .......................... 60/788 |
| 4,856,377 A | 8/1989 | Goudreau et al. | |
| 4,916,894 A | 4/1990 | Adamson et al. | |
| 5,030,185 A * | 7/1991 | Kawamura | .................. 475/227 |
| 5,081,832 A | 1/1992 | Mowill | |
| 5,114,103 A | 5/1992 | Coffinberry | |
| 5,553,448 A | 9/1996 | Farrell et al. | |
| 5,799,484 A | 9/1998 | Nims | |
| 5,867,979 A * | 2/1999 | Newton et al. | ............. 60/226.1 |
| 6,124,646 A | 9/2000 | Artinian et al. | |
| 6,526,757 B2 | 3/2003 | Mackay | |
| 6,647,708 B2 | 11/2003 | Bornhoft et al. | |
| 6,792,745 B2 | 9/2004 | Wojciechowski | |
| 6,895,741 B2 | 5/2005 | Rago et al. | |
| 6,968,701 B2 | 11/2005 | Glahn et al. | |
| 7,481,062 B2 * | 1/2009 | Gaines et al. | .................. 60/792 |
| 7,552,582 B2 * | 6/2009 | Eick et al. | ................. 60/39.163 |
| 7,621,117 B2 * | 11/2009 | Dooley et al. | .............. 60/226.1 |

(Continued)

FOREIGN PATENT DOCUMENTS

EP       1617053 A2    10/2006

(Continued)

*Primary Examiner*—Ted Kim
(74) *Attorney, Agent, or Firm*—McNees Wallace & Nurick, LLC (57) ABSTRACT

A system for transferring mechanical torque variably between a plurality of rotating machines in a turbofan engine. Two devices are used, where the first device relies upon magnetic properties of a planetary magnetic gearbox to couple the magnetic machines. The second device is used to variably control the torque transfer between the magnetic machines. The system couples rotating shafts rotating at differing speeds within a turbofan engine for controllably transferring power. To transfer power in the system, a fixed gear ratio is obtained by coupling the relatively high- and low-speed engine shafts to an epicyclic magnetic gearbox.

13 Claims, 4 Drawing Sheets

U.S. PATENT DOCUMENTS

| | | |
|---|---|---|
| 2005/0056021 A1 | 3/2005 | Beloken et al. |
| 2006/0042252 A1 | 3/2006 | Derouineau |
| 2007/0265761 A1* | 11/2007 | Dooley et al. ............... 701/100 |
| 2008/0136189 A1* | 6/2008 | Qu et al. ..................... 290/52 |

FOREIGN PATENT DOCUMENTS

| | | | |
|---|---|---|---|
| JP | 58-165700 | * | 9/1983 |
| WO | 9600845 A1 | | 1/1996 |
| WO | 9726454 A1 | | 4/1997 |

* cited by examiner

VARIABLE COUPLING OF TURBOFAN ENGINE SPOOLS VIA OPEN DIFFERENTIAL GEAR SET OR SIMPLE PLANETARY GEAR SET FOR IMPROVED POWER EXTRACTION AND ENGINE OPERABILITY, WITH TORQUE COUPLING FOR ADDED FLEXIBILITY

FIELD OF THE INVENTION

The present invention is directed to a method and apparatus for coupling of rotating machines, and more specifically to coupling of high pressure (HP) and low pressure (LP) turbine shafts of a turbofan machine.

BACKGROUND OF THE INVENTION

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller diameter, can be driven at a higher rotational speed. Therefore, separate high and low pressure turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting this additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. The LP engine spool provides an alternate source of power transfer, however, the relatively lower speed of the LP engine spool typically requires the use of a gearbox, as slow-speed electrical generators are often larger than similarly rated electrical generators operating at higher speeds. However, extracting this additional mechanical power from an engine when it is operating at relatively low power levels (e.g., at or near idle descending from altitude, low power for taxi, etc.) may lead to reduced engine operability. It is therefore desirable at times to increase the amount of power that is available on this spool, by transferring torque and power to it via some other means.

Another source of power within the engine is the low-pressure (LP) spool, which typically operates at speeds much slower than the HP spool, and over a relatively wider speed range. Tapping this low-speed mechanical power source without transformation result in impractically large generators. Many solutions to this transformation have been proposed, including various types of conventional transmissions, mechanical gearing, and electromechanical configurations.

One solution is a turbine engine that utilizes a third, intermediate-pressure (IP) spool to drive a generator independently. However, this third spool is also required at times to couple to the HP spool. The means used to couple the IP and HP spools are mechanical clutch or viscous-type coupling mechanisms.

U.S. Pat. No. 6,895,741, issued May 24, 2005, and entitled "Differential Geared Turbine Engine with Torque Modulation Capacity", discloses a mechanically geared engine having three shafts. The fan, compressor, and turbine shafts are mechanically coupled by applying additional epicyclic gear arrangements. The effective gear ratio is variable through the use of electromagnetic machines and power conversion equipment.

A torque sensing TORSEN® differential (TORSEN® is a registered trademark of JTEKT Torsen North America Inc) is a mechanical device that operates without electronic controls, clutches or viscous coupling. The torque sensing TORSEN® differential is known for use in all-wheel drive vehicles. When the engine torque is distributed equally to all wheels, the differential is open. If one or more wheels begins to lose traction, the torque differential causes the gears in the torque sensing TORSEN® differential to mesh. The torque sensing TORSEN® differential is typically designed with a gear ratio or bias ratio, which determines the amount of torque that is applied to the traction wheel relative to the torque that is applied to the slipping wheel. torque sensing TORSEN® differentials are typically used to transfer power between front and rear wheels in all-wheel drive vehicles. The torque sensing TORSEN® differential transfers torque to the stable wheels before actual slippage occurs.

Therefore, what is needed is a system for coupling multiple shafts rotating at discreet speeds in an engine to extract power.

SUMMARY OF THE INVENTION

The present invention is directed to a system for transferring mechanical torque variably between a plurality of rotating machines in a turbofan engine. The system couples rotating shafts rotating at differing speeds within a turbofan engine for controllably transferring power between them. To transfer power in the system, a fixed gear ratio is obtained by coupling the relatively high- and low-speed engine shafts to an magnetic gearbox. A torque sensing mechanism can then be employed within the epicyclic gear train to transfer power from the LP spool to the HP spool, thereby reducing the required power extraction from HP spool. Alternatively a magnetic device that relies upon the properties of a planetary gearbox can be used in place of an epicyclic gearbox. This arrangement offers the advantage of removing the need to mechanically couple the engine spools. This controlled power transfer can be particularly advantageous for extracting increased amounts of mechanical power from an engine, or in enhancing dynamic engine performance. As power is transferred between engine spools and auxiliary loads purely by magnetic forces, the opportunity exists to decouple any or all of the loads to suit operational requirements. The HP spool can be decoupled from the LP spool for engine starting, as an example, or the spools can be decoupled to increase transient response by removing the coupled inertia of the other elements. In a preferred embodiment, additional gearing is provided in order to permit a full range of operability. Another advantage of the present invention is that variable power transfer between the engine shafts is accomplished without a mechanical linkage between the engine shafts.

The present invention is also directed to a method for variably coupling a high pressure spool and a low pressure spools of a turbofan engine to power a generator. The method includes the steps of providing a differential gear portion and an electromagnetic variable transmission, coupling the electromagnetic variable transmission with the high pressure spool and the low pressure spool and controllably transferring torque between the high pressure spool and the low pressure spool through the EVT. The method also includes the steps of connecting the differential gear portion between the high pressure spool and the low pressure spool in parallel with the electromagnetically variable transmission, equalizing a rotational speed of the high pressure spool, a rotational speed of the low pressure spool, and an output speed of an output shaft of the differential gear portion and driving the generator by mechanically coupling the generator to the output shaft.

In another aspect the present invention is directed to a gas turbine engine. The turbine engine includes a compressor, a combustor, a high pressure turbine and a low pressure turbines arranged in serial flow communication and disposed about a longitudinal shaft of the engine within an annular outer casing. The compressor is driven by the high pressure and low pressure turbines and compressor air during operation. A variable coupler portion is also provided for coupling of a high pressure spool and a low pressure spools to power a generator in a turbofan engine. The variable coupler portion includes a differential gear portion having a first input portion, a second input portion, and an output shaft. An electromagnetic variable transmission has an independently rotatable inner rotor portion and an independently rotatable outer rotor portion. The inner rotor portion is coupled with either the high pressure spool or the low pressure spool, and the outer portion connected to the remaining spool, to transfer torque between the high pressure spool and the low pressure spool. The differential gear portion is connected between the high pressure spool and the low pressure spool in parallel with the electromagnetically variable transmission. The generator is mechanically coupled to the output shaft. The differential gear portion is arranged to equalize the rotational speed of the high pressure spool, the low pressure spool, and the output speed of the output shaft for driving the generator. The EVT is arranged to controllably couple power from the low pressure spool to the high pressure spool.

The present invention can be located either internal or external to the engine nacelle or housing. While the variable magnetic gearbox of the present invention is described in association with a turbofan engine, it is considered within the scope of the invention to apply the variable magnetic coupling to any mechanical equipment requiring variable torque transmission, e.g., hybrid automotive transmissions.

In some cases of the present invention, it may also be desired to couple additional power on to the HP spool. When additional power is transferred and made available from the LP spool to HP, the power split can be configured more heavily toward the HP spool. This can result in a lower speed range at the load. Mechanisms for accomplishing this added coupling, and the benefits of it, are within the scope of the present invention and explained in further detail below.

One disclosed system for coupling additional power to the HP spool uses electromagnetically variable transmission (EVT). The EVT permits controllable coupling of torque from the LP spool to the HP spool, when added power is needed from the HP spool. By providing this function, the ratios of the open differential can be selected to bias the power draw more heavily from the HP. A planetary gear box (PGB) may also be substituted for the open differential, since the PGB performs the same function of splitting torque and speed. In so doing, the speed range of the differential output (or PGB carrier) is reduced. In turn, this permits the sizing of an electrical generator to be more favorable, as well as the electrical operating frequency of the connected power system. This enables the use of the EVT where physically smaller systems are required.

Another method for coupling additional power to the HP spool is through the application of a limited-slip differential. In a conventional automobile application, a limited-slip differential prevents the wheel speeds from diverging by more than a configured amount, by providing extra torque to the slower wheel, and less to the faster wheel. This helps to ensure that the power transmitted to both wheels remains within a desired range. The same principle applies in the present invention where the HP spool and LP spool input speeds to the differential are such that the slip-limiting mechanism of the differential is engaged and biases the torque transmission more strongly from the HP spool during certain engine operating conditions. One system for providing such a torque biasing is a TORSEN® differential. The TORSEN® differential for providing torque biasing does rely in part on friction to transmit torque using thrust plates, but it does not require clutches or disks that are typically subject to higher wear rates.

The present invention allows the extraction of power from either of the engine spools of a turbofan engine in a configurable and dynamic system. It also provides the ability for a smaller electrical generator system to draw power from the LP spool turbine than would be possible otherwise. Further, the present invention provides greater capability in airframe electrical power system design, while minimizing the impact on engine operability. Coupling the torque from both the LP spool turbine and HP spool turbine torque provides a solution to the power extraction problem. In addition, the use the torque coupling system with a differential (or PGB) enables the interoperability of machines of various sizes and types. Further, the application of an EVT device permits controlled coupling of torque, without any mechanical contact between the HP spool and LP spool turbines. A slip-limiting differential of the present invention enables torque biasing to further improve the operating speed range at the load.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
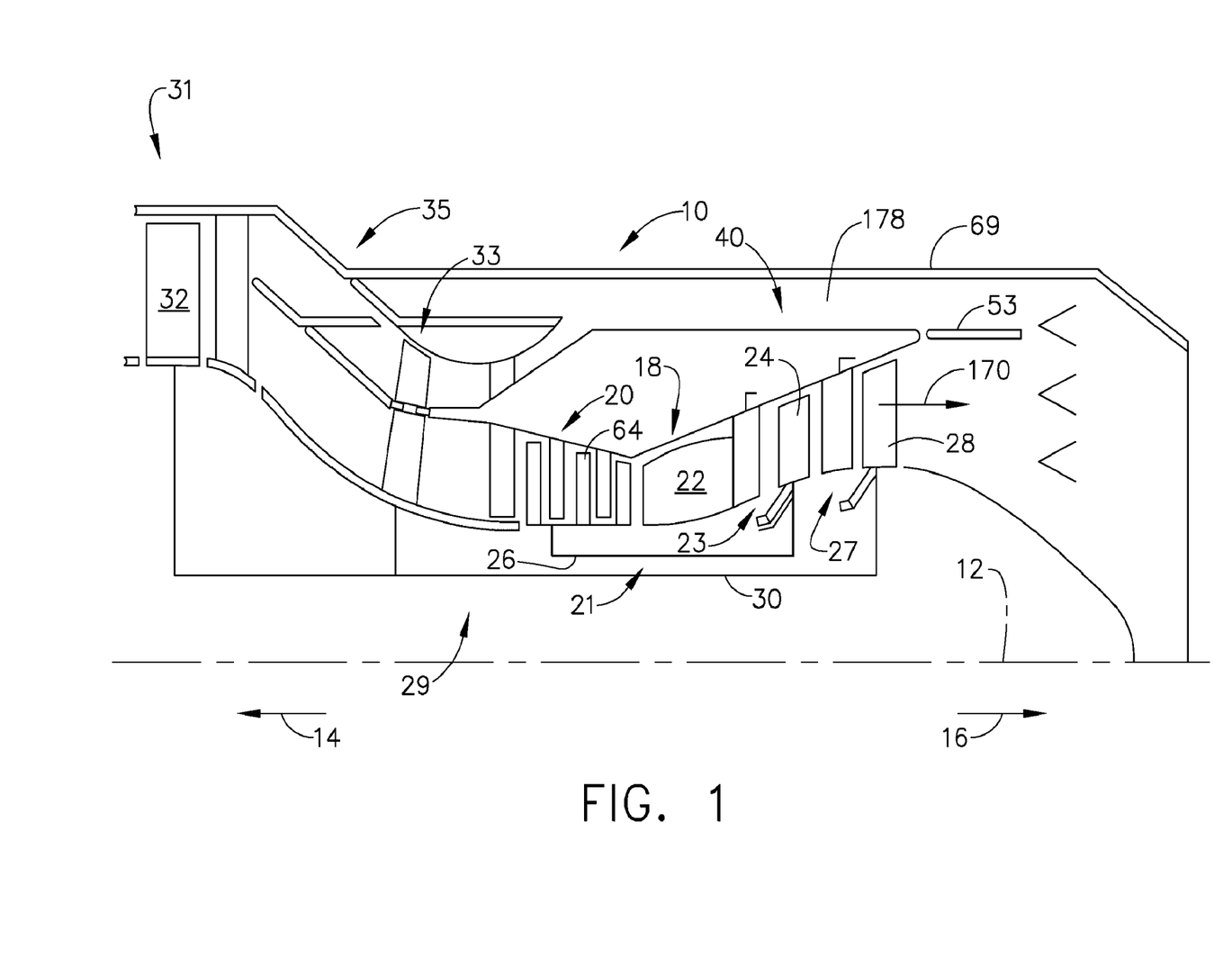
FIG. 1 is a longitudinal sectional view schematic illustration of an exemplary aircraft turbofan gas turbine engine.

Illustrated in FIG. 1 is an exemplary turbofan engine 10 having a generally axially extending axis or centerline 12 generally extending in a forward direction 14 and an aft direction 16. The bypass turbofan engine 10 includes a core engine 18 (also called a gas generator) which includes a high pressure compressor 20, a combustor 22, and a high pressure turbine (HPT) 23 having a row of high pressure turbine blades 24, all arranged in a serial, axial flow relationship. High-pressure compressor blades 64 of the high-pressure compressor 20 are fixedly connected in driving engagement to the high pressure turbine blades 24 by a larger-diameter annular core engine shaft 26 which is disposed coaxially about the centerline 12 of the engine 10 forming a high pressure spool 21.

A combustor 22 in the core engine 18 mixes pressurized air from the high-pressure compressor 20 with fuel and ignites the resulting fuel and air mixture to produce combustion gases. Some work is extracted from these gases by the high-pressure turbine blades 24, which drives the high-pressure compressor 20. The combustion gases are discharged from the core engine 18 into a power turbine or low-pressure turbine (LPT) 27 having a row of low-pressure turbine blades 28. The low-pressure turbine blades 28 are fixedly attached to a smaller diameter annular low-pressure shaft 30, which is disposed coaxially about the centerline 12 of the engine 10 within the core engine shaft 26 forming a low-pressure spool 29. The low-pressure shaft 30 rotates axially spaced-apart first and second stage fans 31 and 33 of an engine fan section 35. The first and second stage fans 31 and 33 include first and second stage rows of generally radially outwardly extending and circumferentially spaced-apart first and second stage fan blades 32 and 36, respectively.

A fan bypass duct 40 circumscribes the second stage fan 33 and the core engine 18. Core discharge airflow 170 is discharged from the low pressure turbine 27 to mix with a bypass airflow 178 discharged from the fan bypass duct 40 through a rear variable area bypass injector (VABI) 53. Mixing takes place in a tail pipe 69 in which exhaust flow is formed, which is discharged through a variable area exhaust nozzle 122. An optional afterburner 130 may be used to increase the thrust potential of the engine 10.

Figure 4:
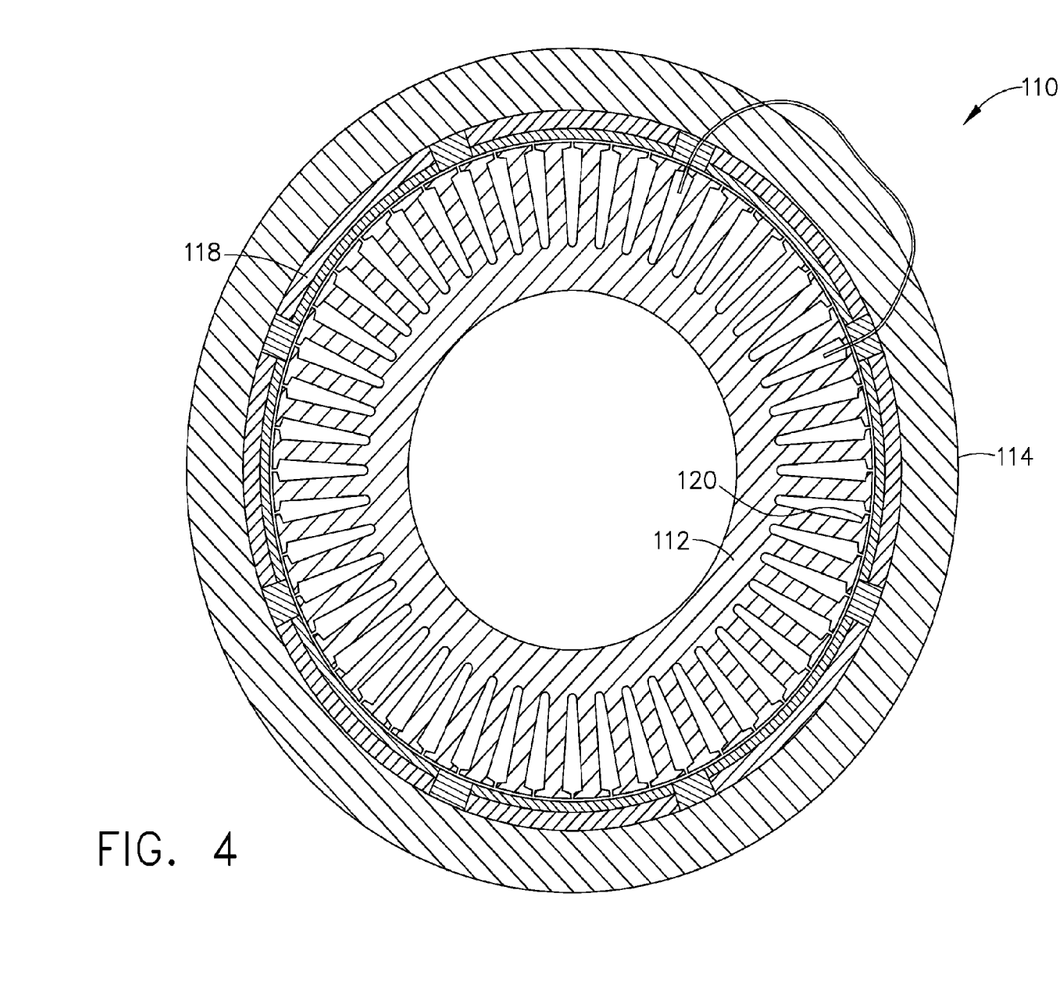
FIG. 4 is a cross-sectional schematic diagram of an electromagnetically variable transmission (EVT).

Referring next to FIG. 4, an electromagnetically variable transmission (EVT) includes a hollow cylindrical outer rotor portion 114 and a hollow cylindrical inner rotor portion 112. The inner rotor portion 112 is located within a center aperture of the outer rotor portion 114. The rotor portions 112, 114 are mutually independently rotatable. The inner rotor portion 112 is independently rotatable within the outer rotor portion 114.

The outer rotor portion 114 is independently rotatable circumferentially about the inner rotor portion 112. The outer rotor portion 114 has a plurality of permanent magnets pairs 118 spaced about an inner or first surface 120. The magnets 118 are configured in pairs and facing an air gap. The air gap is disposed between the outer rotor portion and the inner rotor portion. The other one of the outer and inner rotor portions has a plurality of slots spaced about a magnetically permeable core portion. The outer rotor portion and the inner rotor portion are simultaneously rotatable in one direction. In response to co-rotation of the outer rotor portion and the inner rotor portion, a magnetic flux path is generated between the plurality of permanent magnet pairs, the air gap and the inner rotor portion core. The magnetic flux path induces electrical power in the windings and causes mechanical power to be transferred between the inner rotor portion 112 and the outer rotor portion 114.

Torque transfer is achieved between concurrently rotating shafts through a rotating electromagnetic field without any mechanical connection between the two shafts. Induced field current is all that is required to generate electromagnetic fields.

The electromagnetically variable transmission (EVT) 110 includes two rotating components, an inner rotor 112 and an outer rotor 114. Both the inner rotor 112 and the outer rotor 114 rotate in the same direction around a common axis. The inner rotor 112 has multiple permanent magnet pole pairs 118 facing the inner surface 120 of the outer rotor 114. The rotor core 128 is similar in construction to a permanent magnet (PM) rotor in an inside-out PM electrical machine. A more detailed description of the EVT is set forth in U.S. patent application Ser. No. 11/567,592, assigned to the assignee of the present invention and filed on even date herewith, which patent application is hereby incorporated by reference as if set forth in its entirety.

Figure 2:
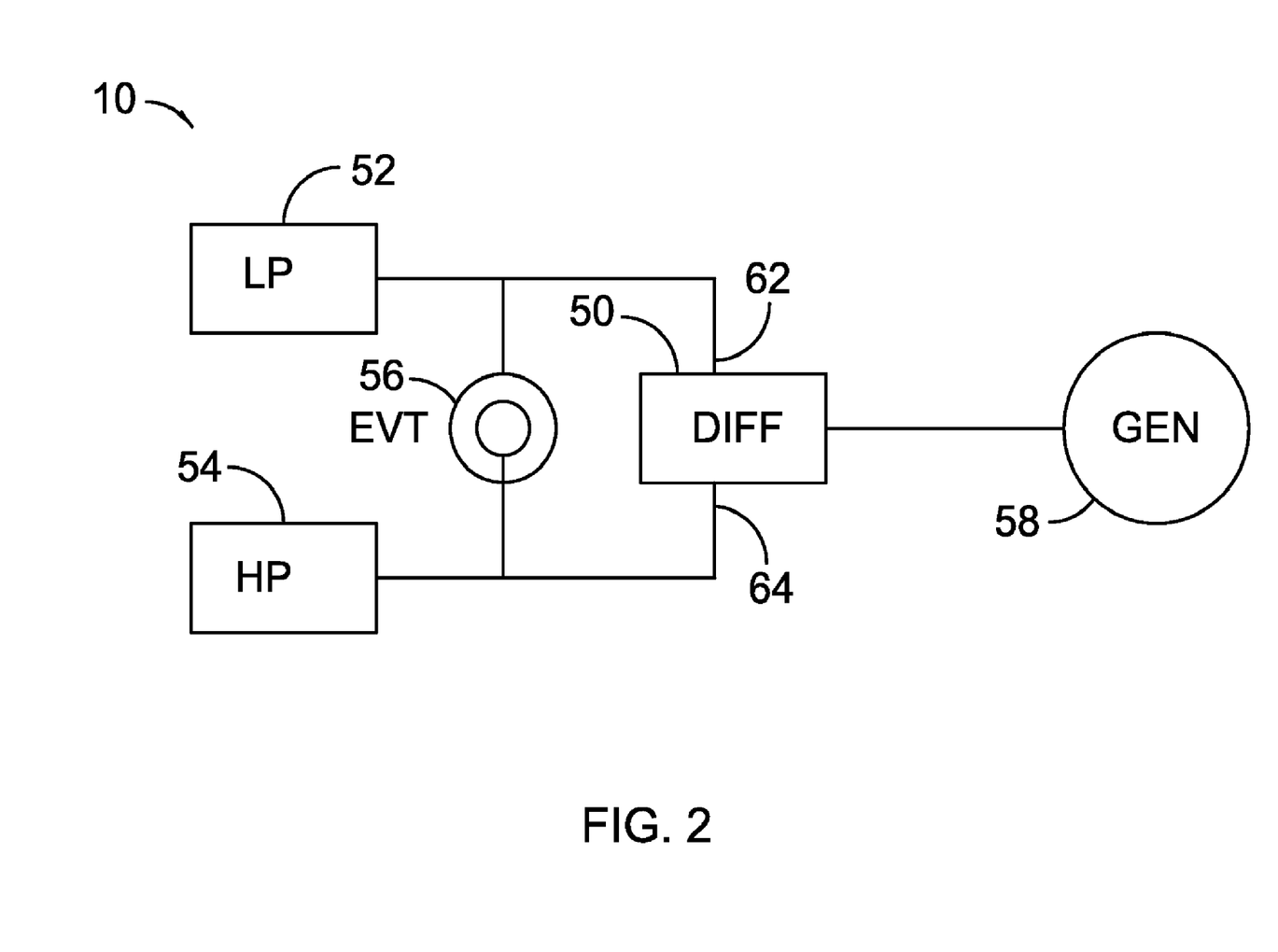
FIG. 2 is a power flow diagram describing the arrangement of a EVT to bias torque between engine spools while delivering power to the generator.

Referring to FIG. 2, a differential or planetary gear set 50 is connected to the HP spool 54 and the LP spool 52 of the engine 10 to enable the desired ratio of power sharing between the spools. In parallel with the differential or planetary gear set 50, is the electromagnetic variable transmission (EVT) 56 to controllably couple power from the LP spool 52 to the HP spool 54 when necessary. The differential 50 is then coupled to the generator 58 to produce power. For a given engine operating condition, the power drawn from each spool 52, 54 may be split according to the respective speeds applied at a differential gearbox 50. For example: if the speed of the HP spool 54 is 10000 rpm, and the speed of the LP spool 52 is 1000 rpm, after gearing the speed of the HP spool 54 down by a ratio of 2:1 and the speed of the LP spool 52 up by a ratio of 5:1, the resulting speeds at the opposing inputs 62, 64 of the differential 50 will be 5000 rpm, and the differential carrier will also be 5000 rpm. As a load is applied to the differential output, the torque splits equally across the differential input and since the opposing inputs are matched in speed, the power draw from each is equal. As the engine 10 changes conditions, the power split between the HP spool 54 and LP spool 52 changes accordingly. The load supplied by the differential output may be either an electrical or mechanical load. When an increase in engine speed occurs, the spool with the greater relative speed change will pick up a larger share of the load. While it may not be optimal for one spool to bear a greater share of the load, load transfer is a necessary characteristic of this arrangement. The gear set 50 employs a train of gears that operate with a fixed speed relationship based on their relative sizing, and the sizing of the HP and LP gears is different in order to achieve the desired speed ratio. The torque on each shaft must be equal in order to maintain steady-state operation. Since power is equal to torque times speed, the total power transferred on each shaft is proportional to the speed that the shaft is spinning. The shaft spinning at a faster speed with the same torque must transmit more power. This can be referred to as a "speed splitting" device and is not a "power splitting" device. This coupling also alleviates a problem of tapping power from the LP spool 52, which often has a very wide speed range. A wide speed variation between the spools 52, 54 causes difficulty in designing generators and power systems to accommodate the various speeds and speed ranges. Another means to couple the HP spool 54 and the LP spool 52 is a mechanical clutch or viscous-type coupling mechanism. Viscous coupling involves having two sets of plates inside a sealed housing that is filled with a thick fluid. One set of plates is connected to each output shaft. Under normal conditions, both sets of plates and the viscous fluid spin at the same speed. When one spool spins faster than the other, the set of plates corresponding to that spool spins faster than the other. The viscous fluid, stuck between the plates, tries to catch up with the faster disks, dragging the slower disks along. This transfers more torque to the slower moving spool.

In addition, the generator and power systems operate more efficiently at and prefer lower speed ranges (i.e. ratio of maximum speed to minimum speed). The mechanical coupling of the HP spool 54 and LP spool 52 enables an averaging of the speeds and speed ranges of both spools. For example, if the LP spool 52 has a speed range of 4 to 1 and the HP spool 54 has a speed range of 2 to 1, the resulting speed range of the load will be 3 to 1. This enables smaller and simpler generators to be applied as a load rather than trying to design a generator or power system to accommodate the wider range of speeds. This gear coupling is also accomplished by using a simple planetary gearbox (not shown), where the sun and ring gears of a planetary are made to be identical in gear size and pitch. For this planetary gear set, one possible arrangement includes one spool geared to the sun gear, and the other spool geared to the ring gear and the carrier geared to the load. When a planetary gear set is used, the required input gear ratios from the spools will be different, however, the exact same mathematical conditions can be satisfied as with the gear coupling.

Figure 3:
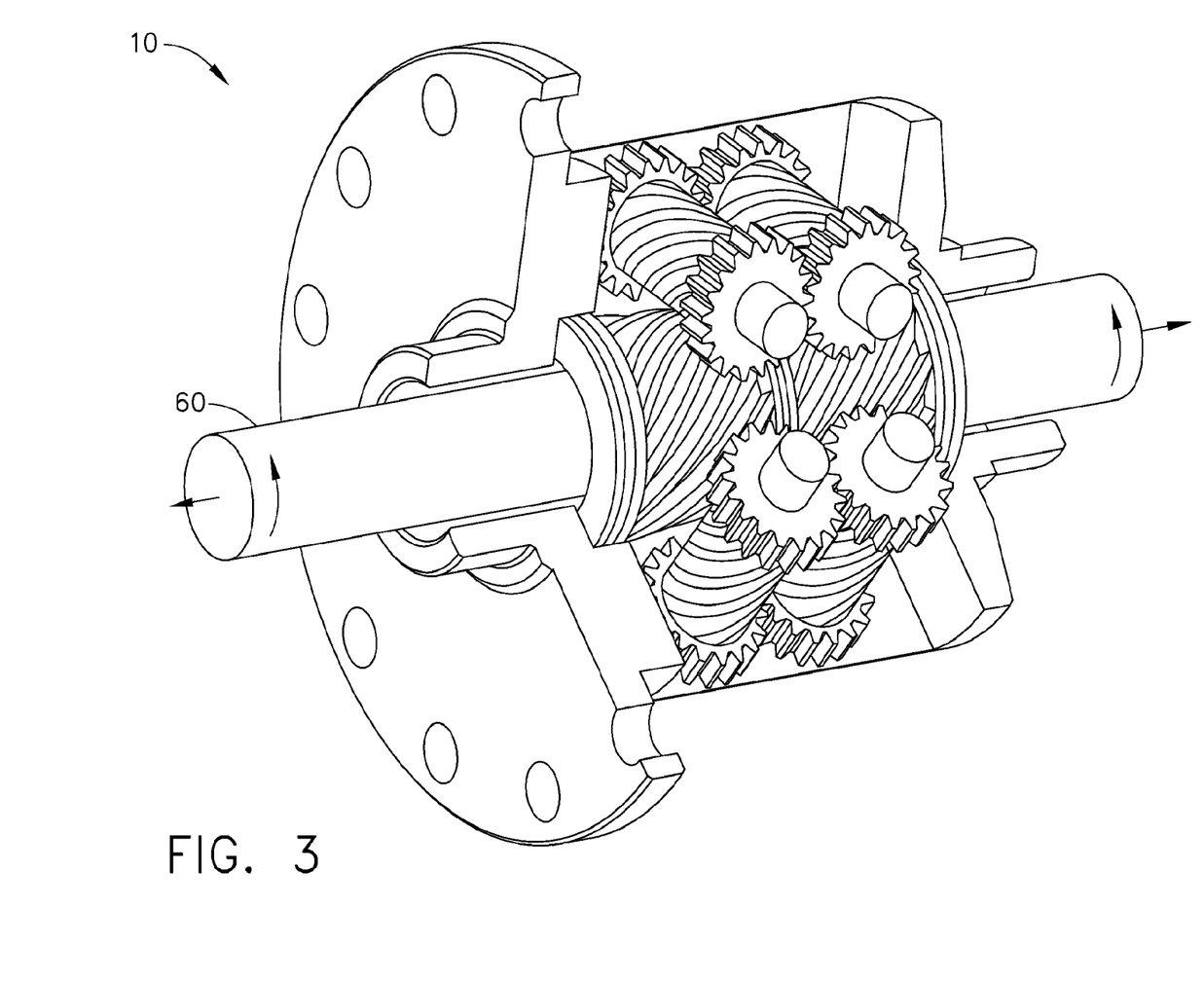
FIG. 3 is a fragmentary view of the torque sensing TORSEN® Differential of the present invention.

FIG. 3 illustrates a fragmentary view of a torque sensing TORSEN® differential gear case 50. The differential gear case 50 is coupled to the HP spool 54 and LP spool 52 spools to distribute the power. The shaft 60 is disposed to run from the differential 50 to the generator (not shown). The differential 50 allows the HP spool 54 and LP spool 52 to shift their speeds to the differential and average out the speeds of both spools 52, 54 to produce a more efficient operating machine 10.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the present invention, but that the invention will include all embodiments falling within the scope of the appended claims.

The invention claimed is:

1. A system for variable coupling of a high pressure spool and a low pressure spools to power a generator in a turbofan engine, the system comprising:

a differential gear portion having a first input portion, a second input portion, and an output shaft;

an electromagnetic variable transmission having an independently rotatable inner rotor portion and an independently rotatable outer rotor portion, the inner rotor portion coupled with one of the high pressure spool and the low pressure spool, and the outer portion connected to the other spool, to transfer torque between the high pressure spool and the low pressure spool;

the differential gear portion being connected between the high pressure spool and the low pressure spool in parallel with the electromagnetically variable transmission;

the generator mechanically coupled to the output shaft;

wherein the differential gear portion being arranged to equalize a rotational speed of the high pressure spool, a rotational speed of the low pressure spool, and an output speed of the output shaft for driving the generator; and the EVT arranged to controllably couple power from the low pressure spool to the high pressure spool.

2. The system of claim 1, wherein the high pressure spool is connected to the first input portion, and the low-pressure spool is connected to the second input portion.

3. The system of claim 1, wherein the low pressure spool is connected to the first input portion, and the high pressure spool is connected to the second input portion.

4. The system of claim 1 wherein the differential gear portion is a planetary gear box.

5. The system of claim 1 wherein the differential gear portion is an open differential gear box.

6. The system of claim 1 wherein the differential gear portion is a limited-slip differential or a torque sensing TORSEN® differential.

7. The system of claim 1 wherein the differential gear portion comprises at least one viscous coupling.

8. A method for variably coupling a high pressure spool and a low pressure spools of a turbofan engine to power a generator, the method comprising:

providing a differential gear portion and an electromagnetic variable transmission;

coupling the electromagnetic variable transmission with the high pressure spool and the low pressure spool;

controllably transferring torque between the high pressure spool and the low pressure spool through the EVT;

connecting the differential gear portion between the high pressure spool and the low pressure spool in parallel with the electromagnetically variable transmission;

equalizing a rotational speed of the high pressure spool, a rotational speed of the low pressure spool, and an output speed of an output shaft of the differential gear portion; and driving the generator by mechanically coupling the generator to the output shaft.

9. The method of claim 8, also including configuring the power transfer ratio to the load based on a predetermined proportion of input speed ratios.

10. The method of claim 8, also including coupling torque from one of the LP or HP spool to the other spool according to a predetermined preference for one of the HP and LP spools.

11. The method of claim 8, also including supplying an electrical load.

12. The method of claim 8, also including supplying a mechanical load.

13. A gas turbine engine comprising:

at least one compressor, a combustor, a high pressure turbine and a low pressure turbine arranged in serial flow communication and disposed about a longitudinal shaft of the engine within an annular outer casing; the at least one compressor driven by the high pressure and low pressure turbines and compressor air during operation;

a variable coupler portion for coupling of a high pressure spool and a low pressure spools to power a generator in a turbofan engine, the variable coupler portion comprising:

a differential gear portion having a first input portion, a second input portion, and an output shaft;

an electromagnetic variable transmission having an independently rotatable inner rotor portion and an independently rotatable outer rotor portion, the inner rotor portion coupled with one of the high pressure spool and the low pressure spool, and the outer portion connected to the other spool, to transfer torque between the high pressure spool and the low pressure spool;

the differential gear portion being connected between the high pressure spool and the low pressure spool in parallel with the electromagnetically variable transmission;

the generator mechanically coupled to the output shaft;

wherein the differential gear portion being arranged to equalize a rotational speed of the high pressure spool, a rotational speed of the low pressure spool, and an output speed of the output shaft for driving the generator; and the EVT arranged to controllably couple power from the low pressure spool to the high pressure spool.

* * * * *